US012699728B2

(12) United States Patent (10) Patent No.: US 12,699,728 B2

Sacilotto et al. (45) Date of Patent: Aug. 4, 2026

(54) DYNAMIC BIN CREATION

(71) Applicant: Avid Technology, Inc., Burlington, MA (US)

(72) Inventors: Roger Sacilotto, Saugus, MA (US); Shailendra Mathur, Beaconsfield (CA)

(73) Assignee: Avid Technology, Inc., Burlington, MA (US)

( * ) Notice: Subject to any disclaimer, the term of this patent is extended or adjusted under 35 U.S.C. 154(b) by 0 days.

(21) Appl. No.: 18/640,923

(22) Filed: Apr. 19, 2024

(65) Prior Publication Data

US 2024/0354330 A1 Oct. 24, 2024

Related U.S. Application Data

(60) Provisional application No. 63/497,423, filed on Apr. 20, 2023.

(51) Int. Cl.
*G06F 16/438* (2019.01)
*G06F 16/432* (2019.01)

(52) U.S. Cl.
CPC ........ *G06F 16/4387* (2019.01); *G06F 16/432* (2019.01)

(58) Field of Classification Search
CPC ............................ G06F 16/4387; G06F 16/432
See application file for complete search history.

(56) References Cited

U.S. PATENT DOCUMENTS

2024/0104806 A1* 3/2024 Braghin .................. G06T 11/40

FOREIGN PATENT DOCUMENTS

WO WO-2014189485 A1 * 11/2014 ......... G06F 16/7335

OTHER PUBLICATIONS

Watchtower Premiere Pro & After Effects extension to auto sync project bins with system folders, pp. 1-15 (Year: 2022).*
Avid Technology, Inc., "Avid Media Composer Editing Guide: How Customer Prepare Bins Manually Today Using Media Composer," 2021, pp. 256-320.
Avid Technology, Inc., "MediaCentral | Media Suite API," 2023, https://developer.avid.com/ctms/.
"Knowledge Graph," Apr. 1, 2023, https://en.wikipedia.org/wiki/Knowledge_graph.

* cited by examiner

*Primary Examiner* — Albert M Phillips, III

(74) *Attorney, Agent, or Firm* — Oliver Strimpel

(57) ABSTRACT

A media editing application is able to populate bins with media project assets that are responsive to a user query. The query is directed to a knowledge graph that includes nodes representing a diverse range of entity types associated with the media project and relationships between the nodes. The results returned by the knowledge graph are used to specify assets that are imported into the media editing application and placed in media project bins. Bins containing assets responsive to a user query extend an editor's reach to production elements in data sources beyond those represented in prior editorial asset systems and support ad-hoc queries that are not anticipated during when media project files are initially configured.

9 Claims, 5 Drawing Sheets

For narrative Scene X, must have Character A *and* Character B.

Key
☐ Pre-production Assets
▨ Camera and Editorial Assets

For narrative Scene X, must have Character A *and* Character B.

Key
☐ Pre-production Assets
▨ Camera and Editorial Assets

DYNAMIC BIN CREATION

BACKGROUND

As part of the editorial workflow for creating a media project, acquired material is organized in containers called bins. Assistant editors manually fill the bins according to guidelines specified by post-production staff. These bins are passed to editors working downstream of the bin arrangements as files that are imported into the application. If the editor needs to see a different arrangement of the content, require content that may be semantically related, or have access to newly acquired content, the editors need to go back to the assistant editors to re-create those bins. This causes inefficiencies of operations, and places limits on the creativity of the editor if the desired content is not immediately available in the bins organized so far.

There is therefore a need to create flexible methods of locating and retrieving material that pertain to a media project.

SUMMARY

In general, a media editing application is able to receive a query from a user requesting assets associated with a media project. The query is directed to a knowledge graph, which returns results that identify assets responsive to the query. The application then creates a bin containing references to and metadata pertaining to the query results.

In general, in a first aspect a method of editing a media project includes: at a media editing application: receiving a query from a user of the media editing application, wherein the query comprises a request for media assets related to a media project; directing the query to a database that stores a knowledge graph, wherein the knowledge graph includes a representation of a diverse types of object related to the media project; receiving from the knowledge graph database results identifying media assets responsive to the query; using the results to import into the media editing application metadata and links corresponding to the identified media assets; storing the imported metadata and identifiers in memory of a system hosting the media editing application; and displaying within a user interface of the media editing application the metadata and identifiers of the identified media assets.

Various embodiments include one or more of the following features. The query is constructed using a query builder software module. The type of object represented in the knowledge graph is one of a pre-production type, a cast or crew type, a visual effects type, a camera asset type, and an editorial asset type.

In general, in another aspect, a computer program product comprises: a non-transitory computer-readable medium with computer-readable instructions encoded thereon, wherein the computer-readable instructions, when processed by a processing device instruct the processing device to perform a method of editing a media project, the method comprising: at a media editing application: receiving a query from a user of the media editing application, wherein the query comprises a request for media assets related to a media project; directing the query to a database that stores a knowledge graph, wherein the knowledge graph includes a representation of a diverse types of object related to the media project; receiving from the knowledge graph database results identifying media assets responsive to the query; using the results to import into the media editing application metadata and links corresponding to the identified media assets;

storing the imported metadata and identifiers in memory of a system hosting the media editing application; and displaying within a user interface of the media editing application the metadata and identifiers of the identified media assets.

In general, in further aspect, a system comprising: a memory for storing computer-readable instructions; and a processor connected to the memory, wherein the processor, when executing the computer-readable instructions, causes the system to perform a method of editing a media project, the method comprising: at a media editing application: receiving a query from a user of the media editing application, wherein the query comprises a request for media assets related to a media project; directing the query to a database that stores a knowledge graph, wherein the knowledge graph includes a representation of a diverse types of object related to the media project; receiving from the knowledge graph database results identifying media assets responsive to the query; using the results to import into the media editing application metadata and links corresponding to the identified media assets; storing the imported metadata and identifiers in memory of a system hosting the media editing application; and displaying within a user interface of the media editing application the metadata and identifiers of the identified media assets.

DETAILED DESCRIPTION

Editorial efficiency and creativity are enhanced by using a new kind of bin, referred to herein as a dynamic bin. Dynamic bins organize content-based information returned by queries on a knowledge graph that includes connections to entities defined outside of the editorial processes. Knowledge graphs include nodes that represent entities of a specified class of object. The nodes are connected by relationships that connect the nodes to each other. A typical graph includes nodes belonging to different classes (also referred to as types), and the connections (also referred to as graph edges) between nodes specify relationships based on attributes of the class of which the node is an instance. The attributes are properties that describe a given class, and thus meaningful relationships may be constructed using attributes of the class of node being connected, even if the nodes being connected belong to different classes. The nodes and edges may be annotated with meta-information that provides semantic meaning to the data. Each graph node represents a unique item, such as a person, a place, a physical object, or a concept. A node that contains a basic value such as a number or string is referred to as a literal.

The knowledge graphs described herein may be based on a pre-existing ontology that specifies a set of classes, class attributes, and relationships between instances of nodes of a given type. For example, in the domain of film production, an ontology established by MovieLabs® includes the following types: pre-production assets, cast/crew, VFX assets, camera assets, and editorial assets. The MovieLAbs ontology is described on the MovieLabs web site, which may be accessed at movielabs.com.

We describe herein the use of knowledge graphs with editorial software applications. Each node of a knowledge graph directly or indirectly references an object located in one or more data stores that are accessible from the editorial software. As used herein, the editorial process and the assets that are associated with a media project apply to any kind of media, including still imagery and time-based media such as video and audio. Video editing may be performed using a video editing software application such as Media Composer®, a product of Avid Technology, Inc, Burlington, Massachusetts. Audio editing may be performed using a digital audio workstation software application, such as Pro Tools®, also a product of Avid Technology, Inc. The examples provided are drawn from the video editing process, but the described techniques may be deployed on any time-based and non-time-based media.

Figure 1:
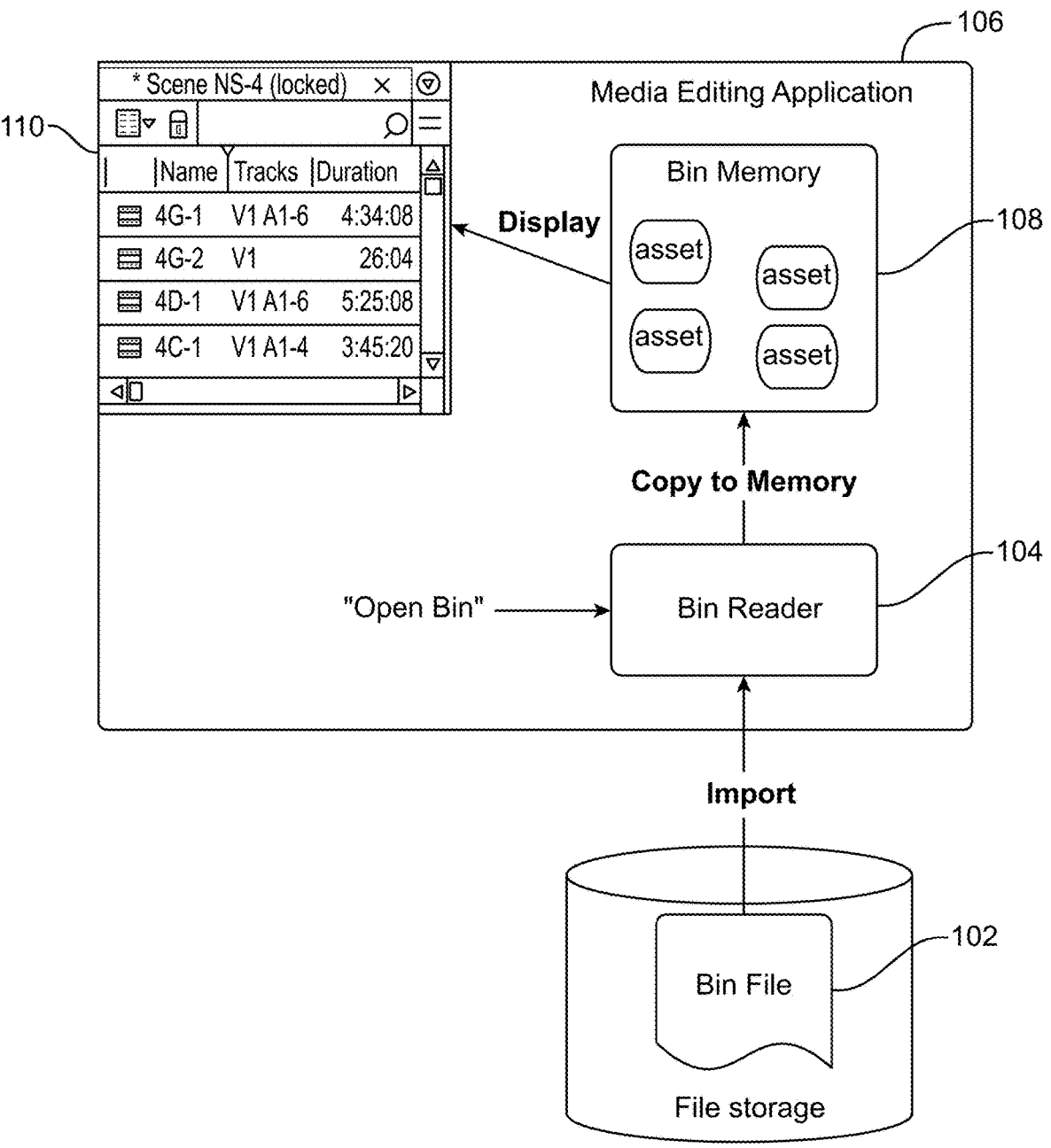
FIG. 1 illustrates the prior editorial practice in which users of non-linear video editing applications work with content by manipulating asset icons with file-based bins.

FIG. 1 illustrates the current practice in which users of non-linear video editing applications work with content by manipulating asset icons in a bin window. Bin 102 is a stored file that contains assets, which are metadata objects that represent content, such as video and audio. Users organize their assets into a set of bin files that are placed in a hierarchical set of folders. When a user wants to see the assets in a particular bin, the user initiates an "open bin" operation that directs the video editing application to open the bin on disk, extract the asset data from the file into memory, and then display the asset data in a window. FIG. 1 illustrates this process, with the "open bin" command activating bin reader 104, a function supported by media editing application 106. The bin reader imports the assets (e.g., a set of video files) and copies them into bin memory 108. The asset data, which comprises metadata corresponding to the media assets, is displayed in window 110.

An alternative way to work with content is to search for it, typically using traditional database and search engine techniques. However, the quality of the search results depends on the accuracy and thoroughness of the users, e.g., the assistant editors, who annotate assets with metadata that describe the content in context of the work that is being done. If the annotations have errors (e.g., a bad transcription) or do not conform to project definitions, the search results may not be as effective as expected, which may have an adverse effect on editorial productivity. The use of dynamic bins supplements conventional search methods by blending knowledge in graph queries with the traditional media asset space to provide more effective content organization.

Figure 2:
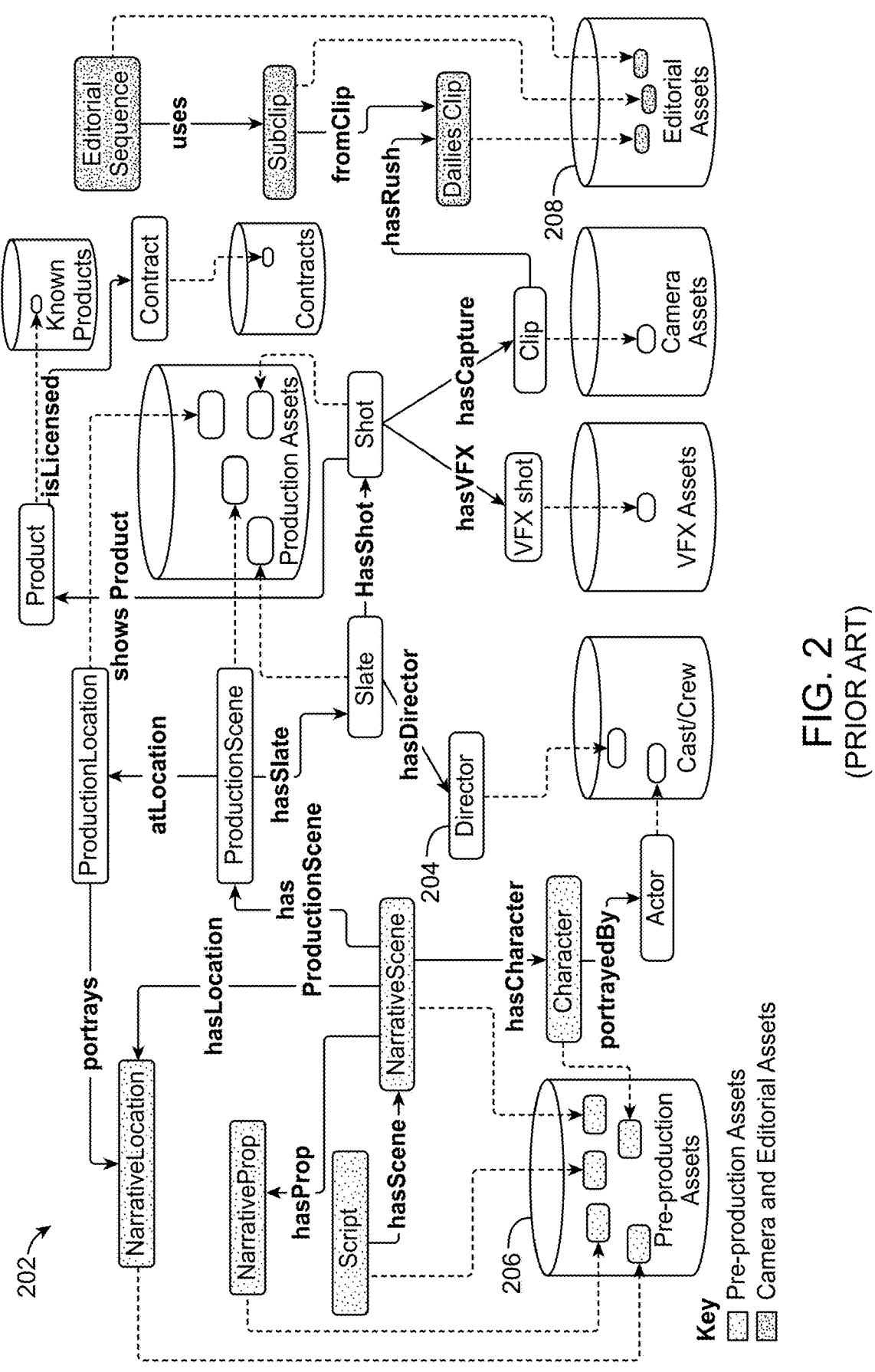
FIG. 2 shows a knowledge graph that links together pre-production, production and post-production nodes that are related to a particular film project.

FIG. 2 shows knowledge graph 202 that links together pre-production, production and post-production nodes that are parts of a film project. In this diagram, the round-edge boxes are graph nodes. The nodes are instances of data, and the text describes the semantic meaning of the objects. For example, Director node 204 indicates there is a node representing a film director and that the information in that node corresponds to a particular director, e.g., Steven Spielberg. Nodes correspond to objects that can be stored in a variety of data stores, which are shown in the figure as cylinders, such as pre-production asset store 206. Each data type may be stored in its own native data format. Note that editorial assets (nodes with dense stippling) are stored in data store 208, which is separate from the pre-production asset store 206, which stores the pre-production assets (nodes with light stippling).

The graph connects the nodes to establish relationships. For example, a scene node can have a relationship with a character node to signify that the related character appears in the given scene. A knowledge graph may be built from diverse types of data generated and managed by software adapted to data of a given type. For the film-production-related knowledge graph illustrated in FIG. 2, such software includes script management software, VFX management software, and camera asset management software.

A very large amount of data is associated with any professional film production project. For example, teams of people are involved in the preproduction, production, and post-production processes. During the course of the project, large numbers of versions and revisions are generated of items such as the contracts, script, scene, shots, production assets, special effects assets, camera assets, and editorial assets such as dailies clips. The diverse types of object associated with a film production project may be assembled automatically to create a knowledge tree for the project in hand. The knowledge graph serves as a comprehensive knowledge base that provides users with a new way to find their content.

Figure 3:
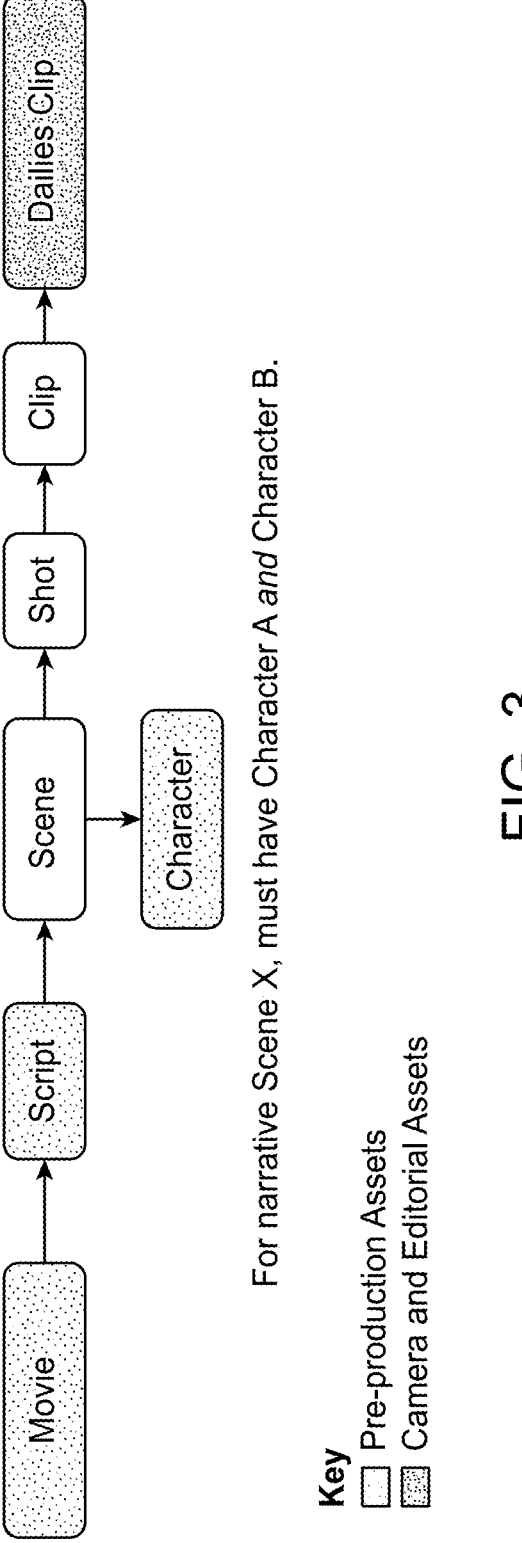
FIG. 3 shows an exemplary query for a knowledge graph pertaining to a film project.

For example, an editor may be working on a new film for a particular film franchise. The editor wants to see various shots from prior films in the franchise of two particular characters interacting in the same scene. In the traditional methodology, the editor's request would only be satisfied if the editorial information was crafted in a way that anticipated what the editor would need. With a knowledge graph spanning the various entities associated with a media project, queries may be created in an ad-hoc manner using the data definitions specified in the knowledge graph. If the requested data is available in a database that stores and provides access to the knowledge graph, a query can be constructed to answer questions such as: "What clips contain Character A and Character B together in any movie?" This may be accomplished using a graph pattern match. In one approach, a query-builder user interface is provided, which allows a user to choose a pattern of elements visually and convert selected choices into formal query expressions. For the example given above, the query may be depicted as shown in FIG. 3.

The graph can be traversed by following the arrows. For example, a film relates to a script, which relates to a scene. Scenes relate to characters and shots. Shots relate to clips which are processed into dailies clips. The dailies clips are the assets the editor wishes to see. For the query example described above, the pattern match finds any scene from the film franchise that has both Character A and Character B. Once the patterns are matched, the query returns the matched dailies clips as results. The identification of the dailies clips is looked up in an editorial database to locate the asset metadata and import them into the media editing application.

A given knowledge graph may be expanded based on media that has already been created. For example, for a given media composition, the sequences of clips placed into various tracks and their representation within the media editing/creation application as a hierarchy of links may be added to a knowledge graph. This would support a query of the type "find the clip that was in this sequence." When editing of the media composition is completed, the knowledge graph is populated with the updated relationships specified by the edits that represent the completed composition. This entails adding further relationships into the entries represented by the "Editorial sequence" node shown in the FIG. 2 ontology.

Figure 4:
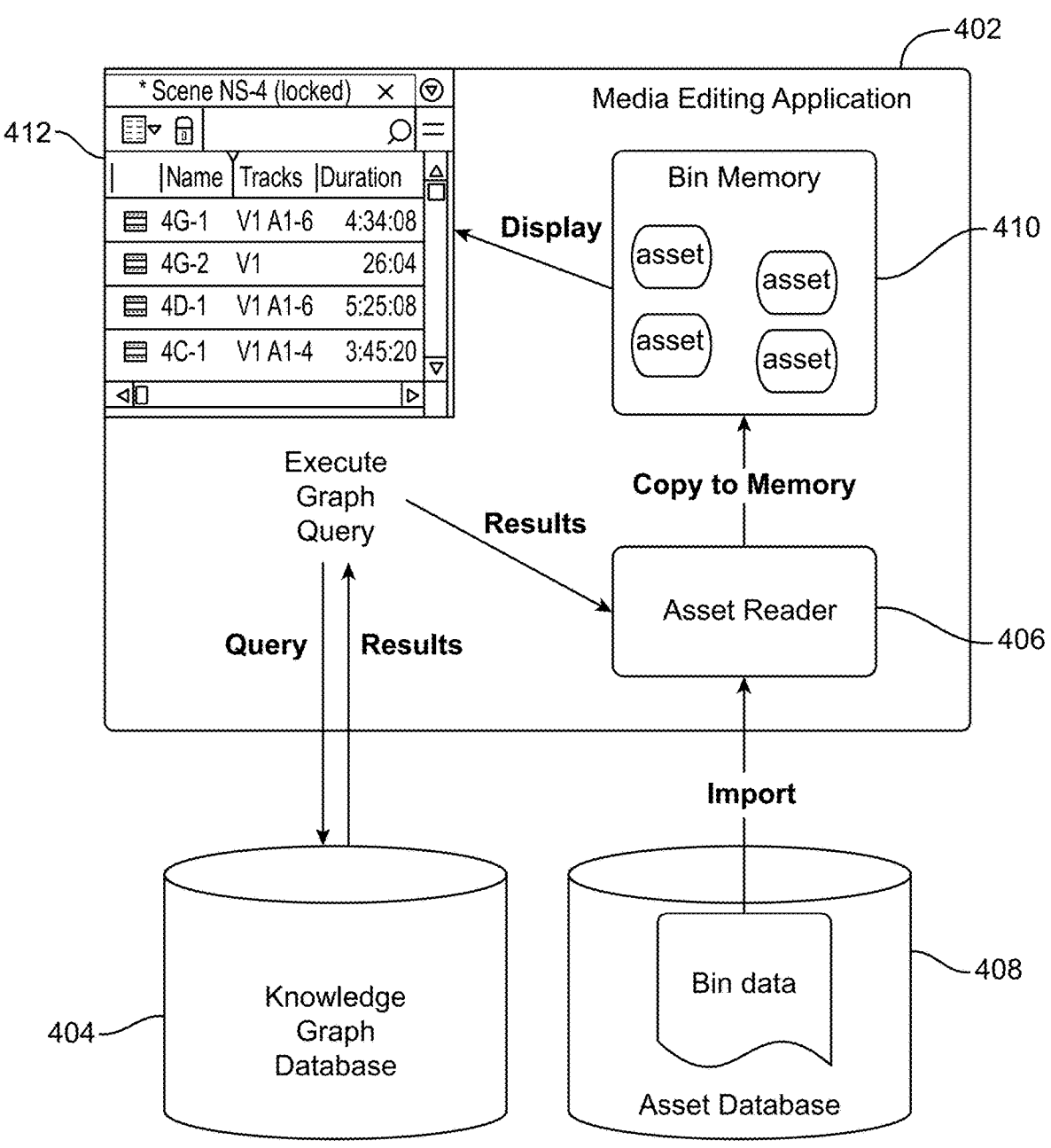
FIG. 4 illustrates the use of a media editing application to enable a user to query a knowledge graph and to populate a bin with assets responsive to the query.

The query and the associated steps taken by the editing application are illustrated in FIG. 4. Media editing application 402 generates a graph query from a query-builder user interface module (not shown) that gives the user a visualization of the pattern-matching options and translates user selections into knowledge graph query statements. The translated query expression may be saved and used again when desired by a user of the media application software, e.g., the editor. The query expression is sent to knowledge graph database 404. The query is pattern matched with the entities present within the knowledge graph as described above. The results are returned to the media editing application and forwarded to asset reader 406, a function implemented by media editing application 402. The asset reader imports from asset database 408 the assets specified by the results returned by the knowledge graph. These are copied to bin memory 410 and displayed in bin window 412 within the user interface of the media editing application. The bin display looks similar to prior file-based bins, and within the media editing application, assets are represented the same way. However, the asset data is imported into memory in response to a different process, with the result that the bin is populated with assets responsive to a query that can encompass the entire range of entities associated with the media project in hand, thus extending the editor's reach to a diverse set of production elements in data sources that are not normally represented in editorial asset systems. Furthermore, the content of a dynamic bin is responsive to a query that may not have been foreseeable, and which, therefore, could not have guided the manner in which the bins were organized at the start of the editorial process.

Natural language queries of the knowledge graph may be supported with machine learning models and large language models that are able to determine a semantic context for the query. For example, if a query includes the word "goal" and the machine learning system determines from the media that it includes a soccer goal (i.e., scoring a goal), the potential ambiguity in meaning may be resolved. Without the ability to establish such a context, many spurious matches may be generated. Alternatively, a LLM may explicitly clarify the semantic context, by asking, for example, "do you mean goal in a sports context or goal as an objective?" The query to the knowledge graph may then be narrowed to the required semantic context. In another example, a query may include "George Bush." The knowledge graph may include two entries, one for the father and one for the son. The LLM is able to ask the user to specify which George Bush is meant before submitting the query to the knowledge graph. Conversely, a semantic search may broaden out the types of result that may be searched for prior to matching the search with metadata in a database. More generally, a LLM may be used to shape a query so as to increase the probability of locating a media asset that is responsive to the user's intended search.

Dynamic bins may be refreshed, with the corresponding query executed again so as to access new or revised content that is received after the bin was created or previously refreshed. At any stage during the editorial process, the knowledge graph may be updated. Data may be created and added manually, or it may be imported. An example of imported text is the annotation of a video, which might include text referencing the content of the video (e.g., in a soccer match, the scoring of a goal), or the name of the director or producer. Knowledge may be pushed from the application's domain into the knowledge graph, automatically populating the knowledge graph with information extracted from the application. Examples include the receipt of new media from the camera, and the creation of a new sequence in the composition's timeline. The relationships between the entities within the media editing application are used to place the application-related information (such as sequences, clips, tracks) into the appropriate category within the knowledge graph.

In various workflows, the use of dynamic bins changes the role of the assistant editor who now prepares and populates a knowledge graph, rather than manually creating and re-creating the file hierarchy of media assets for access by file-based bins.

Figure 5:
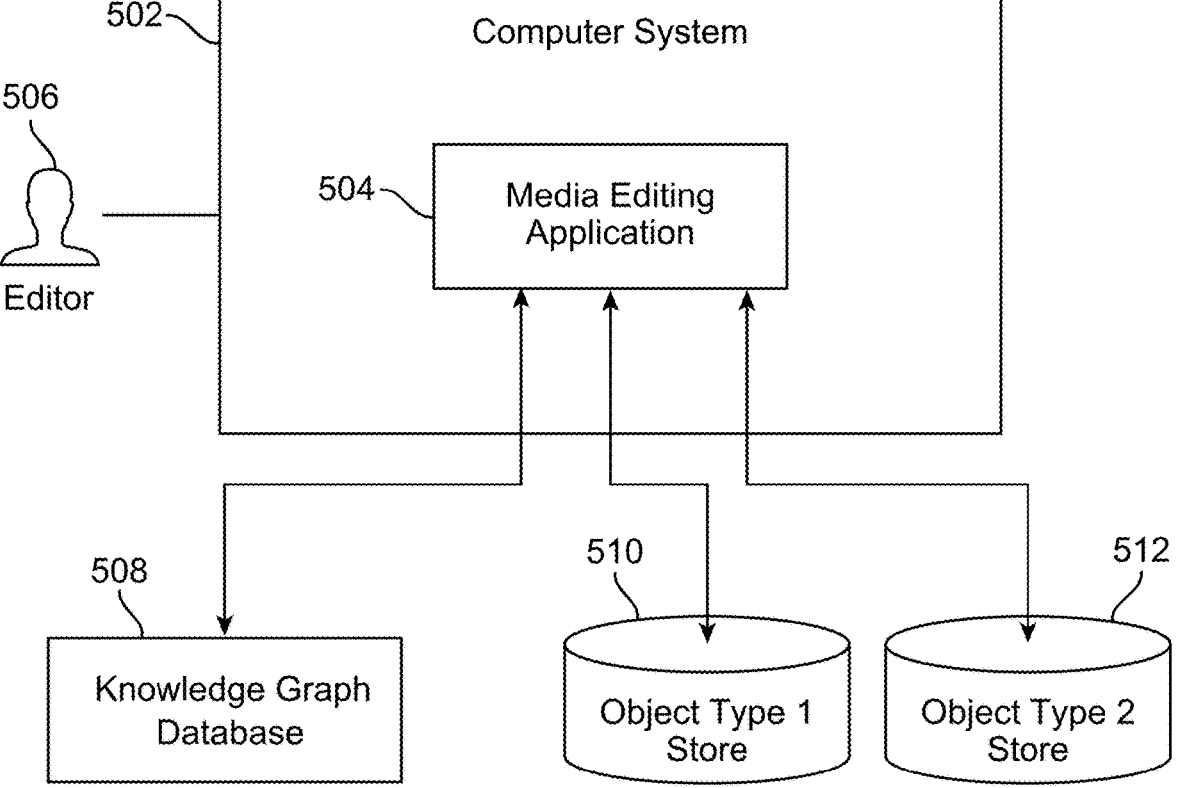
FIG. 5 is a high-level block diagram of a system for implementing the use of dynamic bins with a media editing application.

FIG. 5 is a high-level block diagram of a system for implementing the use of dynamic bins with a media editing software application. Computer system 502 hosts media editing application 504. Editor 506 is a user of the media editing application. The media editing application is in data connection with knowledge graph database 508, which may be hosted on a separate system (not shown) or implemented in the cloud. The media editing application also has data connections with one more data stores containing information about objects of the various types represented in the knowledge graph stored in knowledge graph database 508. The figure illustrates two such data stores-object type 1 store 510 and object type 2 store 512.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, write-able or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer execut-ing such computer program instructions. The computer system may be a multiprocessor computer system or may include multiple computers connected over a computer network or may be implemented in the cloud. The compo-nents described herein may be separate modules of a com-puter program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of editing a media project, the method comprising:

at a media editing application:

receiving a query from a user of the media editing application, wherein the query:

comprises a request for data related to a media project;

specifies the requested data in terms of a semantic relationship between a plurality of entities, each of the plurality of entities being of a different type, and wherein the plurality of entities are capable of being accessed by traversing a knowledge graph that defines relationships among entities relating to the media project; and wherein the relationship was not explicitly defined when the requested data was added to the knowl-edge graph;

directing the query to the knowledge graph;

receiving from the knowledge graph results identifying data responsive to the query;

importing into the media editing application and stor-ing in a memory of a system hosting the media editing application the received results; and displaying the received results within a user interface of the media editing application.

2. The method of claim 1, wherein the query is con-structed using a query builder software module.

3. The method of claim 1, wherein a type of object represented in the knowledge graph is a pre-production type.

4. The method of claim 1, wherein a type of object represented in the knowledge graph is a cast or crew type.

5. The method of claim 1, wherein a type of object represented in the knowledge graph is a visual effects type.

6. The method of claim 1, wherein a type of object represented in the knowledge graph is a camera asset type.

7. The method of claim 1, wherein a type of object represented in the knowledge graph is an editorial asset type.

8. A computer program product comprising:

a non-transitory computer-readable medium with com-puter-readable instructions encoded thereon, wherein the computer-readable instructions, when processed by a processing device instruct the processing device to perform a method of editing a media project, the method comprising:

at a media editing application:

receiving a query from a user of the media editing application, wherein the query:

comprises a request for data related to a media project;

specifies the requested data in terms of a semantic relationship between a plurality of entities, each of the plurality of entities being of a different type, and wherein the plurality of entities are capable of being accessed by traversing a knowledge graph that defines relationships among entities relating to the media project; and wherein the relationship was not explicitly defined when the requested data was added to the knowledge graph;

directing the query to the knowledge graph;

receiving from the knowledge graph results identi-fying data responsive to the query;

importing into the media editing application and storing in a memory of a system hosting the media editing application the received results; and displaying the received results within a user interface of the media editing application.

9. A system comprising:

a memory for storing computer-readable instructions; and a processor connected to the memory, wherein the pro-cessor, when executing the computer-readable instruc-tions, causes the system to perform a method of editing a media project, the method comprising:

at a media editing application:

receiving a query from a user of the media editing application, wherein the query:

comprises a request for data related to a media project;

specifies the requested data in terms of a semantic relationship between a plurality of entities, each of the plurality of entities being of a different type, and wherein the plurality of entities are capable of being accessed by traversing a knowledge graph that defines relationships among entities relating to the media project; and wherein the relationship was not explicitly defined when the requested data was added to the knowledge graph;

directing the query to the knowledge graph;

receiving from the knowledge graph results identifying data responsive to the query;

importing into the media editing application and storing in a memory of a system hosting the media editing application the received results; and displaying the received results within a user interface of the media editing application.

\* \* \* \* \*